United States Patent [19]
Indeck et al.

[11] Patent Number: 5,959,794
[45] Date of Patent: *Sep. 28, 1999

[54] METHOD FOR PRECOMPENSATING SIGNALS FOR MAGNETIC MEDIA NOISE

[75] Inventors: Ronald Scott Indeck, Olivette; Marcel Wettstein Muller; Joseph Andrew O'Sullivan, both of St. Louis, all of Mo.

[73] Assignee: Washington University, St. Louis, Mo.

[*] Notice: This patent is subject to a terminal disclaimer.

[21] Appl. No.: 08/738,345

[22] Filed: Oct. 25, 1996

Related U.S. Application Data

[63] Continuation of application No. 08/208,997, Mar. 10, 1994, abandoned, which is a continuation-in-part of application No. 08/046,071, Apr. 9, 1993, Pat. No. 5,587,654.

[51] Int. Cl.⁶ .................................................. G11B 5/02
[52] U.S. Cl. .................................. 360/25; 360/55; 360/31
[58] Field of Search .................................. 360/25, 65, 55, 360/31

[56] References Cited

U.S. PATENT DOCUMENTS

| | | | |
|---|---|---|---|
| 2,937,241 | 5/1960 | Colbert | 360/25 |
| 3,535,622 | 10/1970 | Cannon et al. | 360/25 |
| 3,755,731 | 8/1973 | Young | 360/25 |
| 4,027,250 | 5/1977 | Lang . | |
| 4,038,692 | 7/1977 | Umeda et al. . | |
| 4,253,184 | 2/1981 | Gitlin et al. . | |
| 4,258,397 | 3/1981 | Kitamura et al. | 360/25 |
| 4,600,890 | 7/1986 | Horvat . | |
| 4,806,740 | 2/1989 | Gold et al. | 235/449 |
| 4,837,426 | 6/1989 | Pease et al. | 235/440 |
| 4,847,558 | 7/1989 | Fisher et al. | 360/25 |
| 4,985,614 | 1/1991 | Pease et al. | 235/440 |
| 5,027,113 | 6/1991 | Bennaval-Lamothe et al. | 340/825.34 |
| 5,093,751 | 3/1992 | Yuki et al. . | |
| 5,177,344 | 1/1993 | Pease | 235/449 |
| 5,365,586 | 11/1994 | Indeck et al. . | |
| 5,416,641 | 5/1995 | Minakawa | 360/27 |
| 5,587,654 | 12/1996 | Indeck et al. | 324/225 |

FOREIGN PATENT DOCUMENTS

| | | |
|---|---|---|
| 58-196606 | 11/1983 | Japan . |
| 59-127209 | 7/1987 | Japan . |
| WO 94/24639 | 10/1994 | WIPO . |
| WO 94/24641 | 10/1994 | WIPO . |
| WO 94/24669 | 10/1994 | WIPO . |

OTHER PUBLICATIONS

Noise Correlation of Magnetic Thin Film Media by Mian, Indeck, and Muller. *Japanese Journal of Applied Physics*, vol. 30, No. 8B, Aug., 1991, L1483–L1485.

Determination of a Track's Edge by Different Power Spectrum by Indeck, Mian, and Muller. *Jpn. J. Appl. Phys.*, vol. 31 (1992), L1065–L1067.

Spatial Noise Phenomena of Longitudinal Magnetic Recording Media, by Hoinville, Indeck, and Muller. *IEEE Transactions on Magnetics*, vol. 28, No. 6 Nov. 1992, 3398–3406.

Measurements and Modelling of Noise in DC–Erased Thin–Film Media, by Vos, Tanaka, Judy. *IEEE Transactions of Magnetics*, vol. 26, No. 5, Sep. 1990, 2149–2151.

Spatial Structure of Media Noise in Film Disks, by Yarmchuk. *IEEE Transactions on Magnetics*, vol. Mag–22, No. 5, Sep. 1986, 877–882.

(List continued on next page.)

*Primary Examiner*—Alan Faber
*Attorney, Agent, or Firm*—Howell & Haferkamp, L.C.

[57] ABSTRACT

A method and apparatus is disclosed for determining the remanent noise in a magnetic medium by DC saturation of a region thereof and measurement of the remaining DC magnetization. Conventional recording transducers may be used to determine the remanent noise. Upon determination, the remanent noise may then be compensated for in either or both of the record and playback modes for all varieties of magnetic media including, videotapes, cassette tapes, etc.

20 Claims, 2 Drawing Sheets

OTHER PUBLICATIONS

Noise From Unsaturated DC Erasure and Peak Shift Of Signals In Longitudinal Thin–Film Disk Media, by Ohara and Sato. *IEEE Transactions on Magnetics,* vol. Mag–23, No. 5, Sep. 1987, 2380–2382.

Novel Applications of Crytography in Digital Communications, by Omura. *IEEE Communications Magazine,* May 1990, 21–29.

A Physically Based Approach to Information Theory for Thin Film Magnetic Recording, by O'Sullivan, Porter, Indeck, and Muller. *Proceedings of the Thirtieth Allerton Conference on Communication, Control and Computing,* Oct. 1992.

Transverse Correlation Length in Thin Film Media, by Mian, Indeck, and Muller. *IEEE Transactions on Magnetics,* vol. 28, No. 5, Sep. 1992, 2733–2735.

A Magnetoresistive Gradiometer, by Indeck, Judy, and Iwasaki. *IEEE Transactions on Magnetics,* vol. 24, No. 6, Nov. 1988, 2617–2619.

An Analysis of Multilayered Thin–Film Magnetic Field Gradiometers Having a Superconducting Spacer, by Indeck. *Journal of The Magnetics Society of Japan,* vol. 13, Supplement, No. S1 (1989), 599–604.

Interaction Factors of a Multi–Layered Magnetic Thin Film System, by Mian, and Indeck. *IEEE Transactions on Magnetics,* vol. 26, No. 5, Sep. 1990, 2415–2417.

An interaction matrix for the energy analysis of an n–layered magnetic thin–film system, by Mian, Indeck. *Journal of Magnetism and Magnetic Materials,* 96 (1991) 248–260.

dc track edge interactions, by Indeck, Reising, Hoinville, Muller. *Journal of Applied Physics,* 69(8), Apr. 15, 1991, 4721–4723.

Track edge fluctuations, by Muller, Indeck, Murdock, and Ornes. *Journal of Applied Physics,* 67(9), May 1, 1990, 4683–4685.

In Situ Measurement of the Remanence Curve of Magnetic Recording Media, by Hoinville, Ornes, Murdock, and Muller. *IEEE Transactions on Magnetics,* vol. 24, No. 6, Nov. 1988, 2976–2978.

An in situ measurement of intergranular coupling in magnetic film media, by Mian, Indeck, and Muller. *Journal of Applied Physics,* 73 (4), Feb. 15, 1993, 2027–2028.

Noise Characterization of Perpendicular Media, by Indeck, Johnson, Mian, Hoinville, and Muller. *Journal of the Magnetics Society of Japan,* vol. 15 Supplement, No. S2, (1991), 173–178.

Authenticating of Forensic Audio Recordings, by Koenig. *Journal of the Audio Engineering Society,* vol. 38, No. 1/2, 1990, 3–33.

Media Noise Reduction in Disk Memory Devices, *IBM Technical Disclosure Bulletin,* vol. 29, No. 11, Apr. 1987, New York, 4987–4988.

Intergranular exchange coupling, by Muller and Indeck. *J. Appl. Phys.,* 75 (4), Feb. 15, 1994, 2289–2290.

Physically Based Information Science of Magnetic Recording—I. Information Capacity of a Medium Model, by O'Sullivan, Porter, Indeck and Muller. *IEEE Transactions On Magnetics,* vol. 29, No. 6, Nov. 1993, 4036–4038.

Recording medium properties and capacity bounds, by O'Sullivan, Porter, Indeck and Muller. *J. Appl. Phys.,* 75 (10), May 15, 1994, 5753–5755.

Physically Based Information Science of Magnetic Recording—ii. Physical Sources of Medium Noise, by Porter, O'Sullivan, Indeck and Muller. *IEEE Transactions On Magnetics,* vol. 30, No. 6, Nov. 1994, 4266–4268.

Magnetic Recording System Design To Reduce Medium Noise Through Signal Precompensation, Agrawal; Master's Thesis, Aug., 1995.

METHOD FOR PRECOMPENSATING SIGNALS FOR MAGNETIC MEDIA NOISE

CROSS REFERENCE TO RELATED APPLICATION

This application is a continuation of application Ser. No. 08/208,997 filed Mar. 10, 1994, now abandoned, which is a continuation-in-part of application Ser. No. 08/046,071 filed Apr. 9, 1993, now U.S. Pat. No. 5,587,654.

GOVERNMENT RIGHTS TO THE INVENTION

This invention was made with government support under grant ECS 9100157 awarded by the National Science Foundation. The government has certain rights in the invention.

BACKGROUND AND SUMMARY OF THE INVENTION

The sources of noise in a readback signal from a magnetic recording medium have been investigated and identified. One of those sources includes the irregularities and defects in the microstructure of the magnetic medium itself. For many years, the noise generated from this source has been thought, as with the noise generated from other identified sources, to be random and subject only to statistical analysis for its determination. The inventors herein have recently demonstrated that this noise component is instead deterministic, i.e. is permanent and repeatable, depending entirely on the transducer-medium position and on the magnetic history of the medium. As confirmed by experiments conducted by the inventors herein, when the medium has had no signal written on it and has been recorded only with DC fields, the observed readback signals are almost identical. The magnetic contribution to the readback signal under these conditions results from spatial variations in the medium's magnetization: magnetic domains, ripple, local fluctuations of the anisotropy field and saturization magnetization. These local properties, in turn, are affected by the morphology and magnetic properties of the individual grains which make up the domain and which do not change after deposition. Hence, the noise from a nominally uniformly magnetized region measured at a fixed position on a magnetic medium is reproducible. As shown by the inventors herein, a magnetic medium may be DC saturated and its output then measured to determine its remanent state or remanent noise. The inventors have confirmed that this remanent noise is a function of the magnetic microstructure by comparing the remanent noise after a positive DC saturation with the remanent noise after a negative DC saturation. It has been found that these wave forms are virtual "mirror images" of each other thereby demonstrating a close correlation. Similarly, other methodologies were used to confirm that the remanent noise was determinative, repeatable, and related to the physical microstructure of the magnetic medium itself. Remanent noise arising from the permanent microstructure Appendixs identifiable features characteristic of that permanent microstructure after practically any magnetic history. See *Spatial Noise Phenomena of Longitudinal Magnetic Recording Media* by Hoinville, Indeck and Muller, *IEEE Transactions on Magnetics*, Volume 28, No. 6, November 1992, the disclosure of which is incorporated herein by reference.

The inventive technique disclosed and claimed herein relies upon the discovery that the microscopic structure of the magnetic medium itself is a permanent random arrangement of microfeatures and therefore deterministic. In other words, once fabricated, the recording medium's physical microstructure remains fixed for all conventional recording processes. In particulate media, the position and orientation of each particle does not change within the binder for any application of magnetic field; in thin film media, the microcrystalline orientations and grain boundaries of the film remain stationary during the record and reproduce processes. It is the magnetization within each of these fixed microfeatures that can be rotated or modified which forms the basis of the magnetic recording process. If a region of a magnetic medium is saturated in one direction by a large applied field, the remanent magnetization depends strongly on the micro-structure of the medium. This remanent state is deterministic for any point on the recording surface. Each particle or grain in the medium is hundreds to thousands of Angstroms in dimension. Due to their small size, a small region of the magnetic surface will contain a very large number of these physical entities. While the fabrication process normally includes efforts to align these particles, there is always some dispersion of individual orientations. The actual deviations will be unique to a region of the medium's surface making this orientation deterministic and making its effects susceptible to elimination. As can be appreciated by those of ordinary skill in the art, noise reduction enables increase in storage capacity, increase in data rates, and eases the burden on transducers, medium, and system design and fabrication.

Although this discovery has been made by the inventors herein, noise reduction techniques based on this discovery have not been implemented. As this noise component of remanent noise is deterministic, it may be reliably repeated and measured at any particular point on a magnetic medium. Accordingly, the inventors have developed several techniques which take advantage of this fact for producing uncorrupted pre-recorded signals which may be played back by any playback device but which, when played back, have already been compensated for the remanent noise component. In other words, a magnetic recording may be recorded at the factory with a signal which has been first compensated for remanent noise such that as the signal is played back later the playback signal or read signal has the remanent noise component virtually eliminated. As the remanent noise component may very well be the most significant factor in noise emanating from pre-recorded magnetic media, this noise reduction technique may very well provide a dramatic reduction in noise with no required modification to the tremendous number of playback machines presently in the public's hands. This would include playback machines for the entertainment industry, etc. In a first embodiment of the invention, the remanent noise is first determined and the recording device compensates the original signal for the remanent noise before writing the compensated signal on the magnetic medium. These steps may be readily achieved with conventional recording transducers, as explained herein. Consequently, very little, if any, modification to existing recording equipment need be made to achieve these noise compensated recordings.

A second methodology will also create uncorrupted pre-recorded signals on magnetic medium. With this method, the signal is first written on the magnetic medium, the written signal is then read from the magnetic medium, this read signal is then compared with the original signal. The differences therebetween are determined to be noise, the greatest component of which is deterministic medium noise. The original signal is compensated to eliminate this noise before being recorded back at the same location on the magnetic medium. Thus, after the compensated signal has been recorded onto the magnetic medium, any other readback or playback machine would then produce a signal which has been compensated for remanent noise.

In still another embodiment of the present invention, the inventors have developed a methodology for compensating a signal read from a magnetic medium for remanent noise in real time. This methodology permits a playback device to be manufactured and sold which can play back pre-recorded magnetic medium which has not itself been compensated prior to recording, and produce a signal which is compensated on readback. With this method, the signal is first read from the magnetic medium, the remanent noise is determined for said magnetic medium, such as by saturating the magnetic medium and reading the remanent noise directly therefrom, and the signals are then compared to eliminate the noise from the original corrupted signal prior to use. As determining the remanent noise, as envisioned by the inventors, involves destroying the original recorded signal when the medium is saturated, another step to the method may well include re-recording either the original signal or its compensated counterpart. Thus, with this methodology, a playback device may take a pre-recorded magnetic medium whose signal has not been compensated, and transform it into a magnetic medium with a compensated signal recorded thereon such that further playbacks of the same magnetic medium would possibly not require compensation. With this methodology, if implemented in one alternative embodiment thereof, a user with a suitable playback machine may very well transform his entire collection of recorded media from non-compensated to compensated magnetic media. In other words, one may readily convert a collection of analog cassette tapes having original non-compensated signals thereon to a collection of analog cassette tapes having compensated signals recorded thereon which may then be played back by any playback device and produce what should be an enhanced signal because of the noise reduction.

In essence, the present invention is elegantly simple and adapted for implementation by conventional recording transducers as are commonly found and used in virtually every read or read/write device presently utilized by the public at large. Such examples include cassette players, magneto-optic disc players, and VCRs. In its simplest implementation, a conventional recording transducer need merely DC saturate a specified portion of a magnetic medium, and then "read" or "play back" the remanent noise which remains. This remanent noise, which is an analog signal, may then be used to compensate an original signal, such as a musical program, dramatic reading, etc.

While the principal advantages and features of the invention have been described above, and a number of examples given, a greater understanding of the invention may be attained by referring to the drawings and the description of the preferred embodiment which follow.

DETAILED DESCRIPTION OF THE PREFERRED EMBODIMENT

Figure 1:
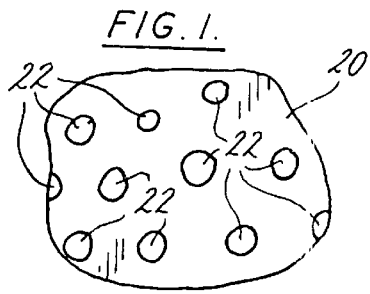
FIG. 1 is a magnified representative depiction of the microscopic structure of a region of magnetic medium.
Figure 2:
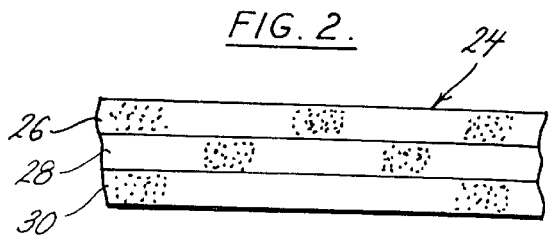
FIG. 2 is a magnified depiction of several tracks of a magnetic medium having microscopic structure representatively shown thereon.

As shown in FIG. 1, a region of magnetic medium 20 is built up with a plurality of microcrystalline structures 22 in a random pattern. This microcrystalline structure 22 is comprised of particles or grains varying from hundreds to thousands of Angstroms in diameter. The view of FIG. 1 is greatly enlarged and magnified in order to depict this physical phenomena. As shown in FIG. 2, this microcrystalline structure extends throughout the magnetic medium even though the magnetic medium 24 shown in FIG. 2 may be itself comprised of tracks 26, 28, 30 as well known in the art.

Figure 3:
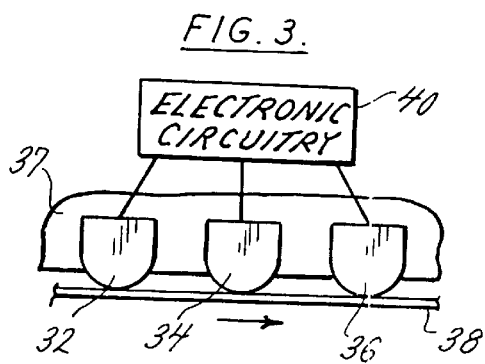
FIG. 3 depicts three conventional recording transducers and a magnetic medium traveling thereunder.

Referring now to FIG. 3, a plurality of conventional recording transducers 32, 34, 36 are shown mounted in a transducer transport 37 with a traveling magnetic medium 38 controllably driven past recording transducers 32, 34, 36 all as is well known in the art. Recording transducers 32–36 are all connected to electronic circuitry 40, as well known in the art, to control and read their input and output and further process signals for playback or other use. Although only three transducers 32, 34, 36 are being shown in FIG. 3, it will be well understood to those of ordinary skill in the art that a plurality of recording transducers of any number may just as easily be provided and, as taught herein, may be required in order to effect the purposes of the present invention. In implementing the present invention, the recording transducers 32–36 as shown in FIG. 3 may be considered as part of a device which is used to create pre-recorded magnetic medium with remanent noise compensated recordings. Alternately, the device shown in FIG. 3 may be considered as a playback unit of either a specialized playback device with means for creating a remanent noise compensated signal from a non-compensated pre-recorded signal, or a standard playback device which may be used to play back a remanent noise compensated magnetic medium. All of these functions are achieved with conventional recording transducers and therefore are readily implemented using existing and available technology.

A remanent noise compensated signal may be pre-recorded onto a magnetic medium by utilizing the following method. The remanent noise of the magnetic medium may first be determined by DC saturating the medium and then reading the remanent noise with a conventional recording transducer. This would take transducer 32 to saturate the medium and transducer 34 to read the remanent noise. The original signal would then be compensated, using conventional compensation circuits as is well known in the art to modify the original signal such that it may then be recorded by recording transducer 36. In this manner, using this method and device as shown in FIG. 3, a pre-compensated recording, pre-compensated for remanent noise, may be created on magnetic medium 38. While there is a fixed and close spacing between transducers 32–36, the remanent noise is itself capable of being used for indexing the transducers 32–36 to thereby ensure that the compensated signal is recorded by transducer 36 for the remanent noise which in fact appears at that point on the magnetic medium for which said compensation has been made. This is because, as explained earlier herein, while the remanent noise is random, it is unique to any particular point on the magnetic medium and thus can be used to identify such point for benchmark purposes. While this is the perferred embodiment, it should be understood that the remanent noise is always there, whether the medium has been recorded over or not. Therefore, it is not strictly necessary that the specified portion of medium containing the remanent noise be DC saturated, or DC saturated in the same polarity in order to obtain the remanent noise.

In a variation of the first embodiment hereof, still another methodology may be used to create a pre-recorded magnetic medium having a signal recorded thereon which is remanent noise compensated. This second embodiment involves the steps of first writing the original signal on the magnetic medium, such as for example by transducer 32 in FIG. 3, reading the recorded signal from said magnetic medium such as by transducer 34, comparing the read signal with the original signal to determine the differences therebetween, compensating the original signal, and then writing the compensated signal with transducer 36. Using this methodology, as with the first embodiment of the present invention, magnetic medium 38 would thus receive a recorded signal which has been compensated for the remanent noise inherent in the magnetic medium 38. These compensated recordings may then be played back by any conventional playback device and produce a signal which is noise compensated. This is important as with this implementation of this embodiment, uncorrupted copies or noise compensated copies of pre-recorded signals may be produced and made available for play back by the large number of playback devices already in the public's hands. This could very well be implemented for improving the pre-recorded playback of musical and dramatic programs on magneto-optic discs, cassette tapes (analog and digital), and VCR video tapes.

The inventors have developed a generalized model with an algorithm for implementing the write-read-write embodiment of the present invention. This generalized model is explained in Appendix A. As noted therein, and referring to FIG. 3 thereof, this generalized model compensates for additive medium noise and explains a design approach for implementing this embodiment with a silicon tap delay line. As shown in FIG. 3 of Appendix A, the signal $s_1(t)$ is processed by a write head, represented by $h(t)$ onto a magnetic medium. As it is written, the signal is corrupted by two kinds of medium noise, non-repeatable medium noise $n_1(t)$ and repeatable additive medium noise $n_A(t)$. This corrupted signal is then read by a read head which processes it as represented by a function $g(t)$. In order to determine the error function portion of the signal, the signal $s_1(t)$ is processed as represented by a function $b(t)$ which is the equivalent of a write and read function, and then subtracted from the output of the read head. Additionally, an electronics noise signal $w_1(t)$ is added to represent the electronics noise. The result is an error function $e(t)$ which is representative of the total noise introduced in the signal $s_1(t)$ by a write and read function. Next, the error function $e(t)$ is then processed by a filter function $c(t)$ which is the inverse of the noise expected to be added by a later write and read function. Finally, the output of the filter function $c(t)$ is subtracted from the data signal $s(t)$ and a write head processes this signal with the function $h(t)$ to record it onto a magnetic medium where it again suffers corruption through the two kinds of magnetic medium noise, repeatable additive medium noise $n_A(t)$ and also non-repeatable medium noise $n_2(t)$. At this point in the model, a signal desired to be recorded, $s(t)$ has been recorded in a precompensated manner as the function $c(t)$ subtracts out the effects of the write function, a later expected read function and the expected repeatable additive medium noise $n_A(t)$. As the magnetic medium is then read by a read head and the signal processed with the function $g(t)$, a signal output $y(t)$ is produced which is clearly compensated for.

Computer simulations have been run on this methodology utilizing the mathematical solutions for the various components of the system. As indicated at page 9 of Appendix A as well as FIGS. 5–7 of Appendix A, the precompensation model disclosed therein with the write-read-write scheme yields a reduction in noise power on average. The amount of the reduction depends on the ratio between the repeatable noise power and all other noise. A distribution of noise powers is shown in Appendix FIG. 5 for 1,000 runs demonstrating the significantly decreased noise levels expected for recording with signal precompensation. Appendix FIGS. 6 and 7 further demonstrate the improved signal wave form which is also achieved.

Figure 7:
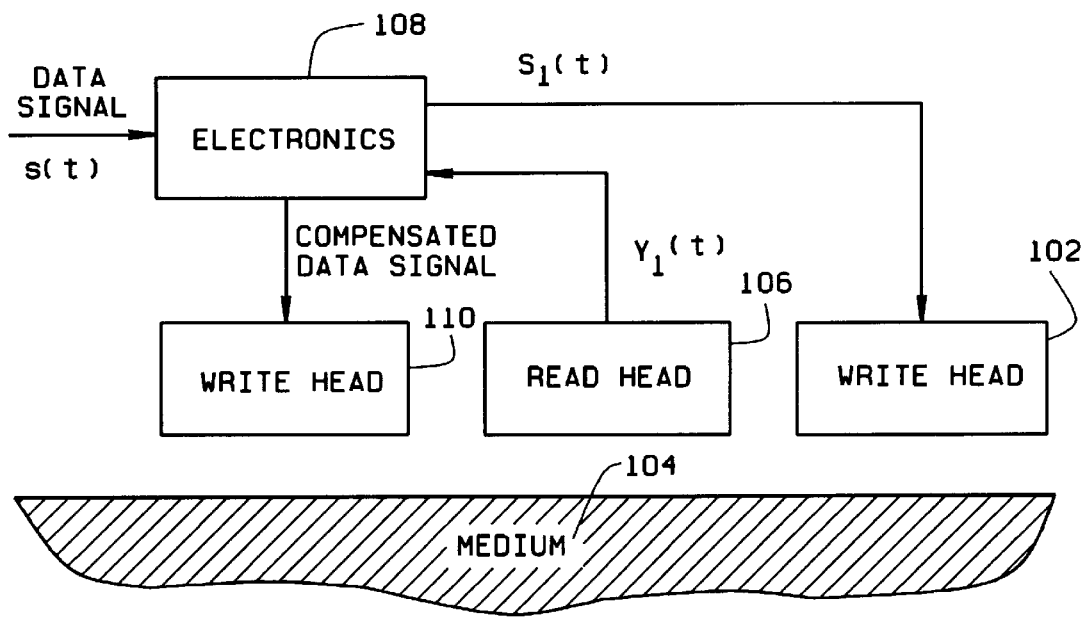
FIG. 7 is a schematic diagram of the write-read-write embodiment of the invention.
Figure 8:
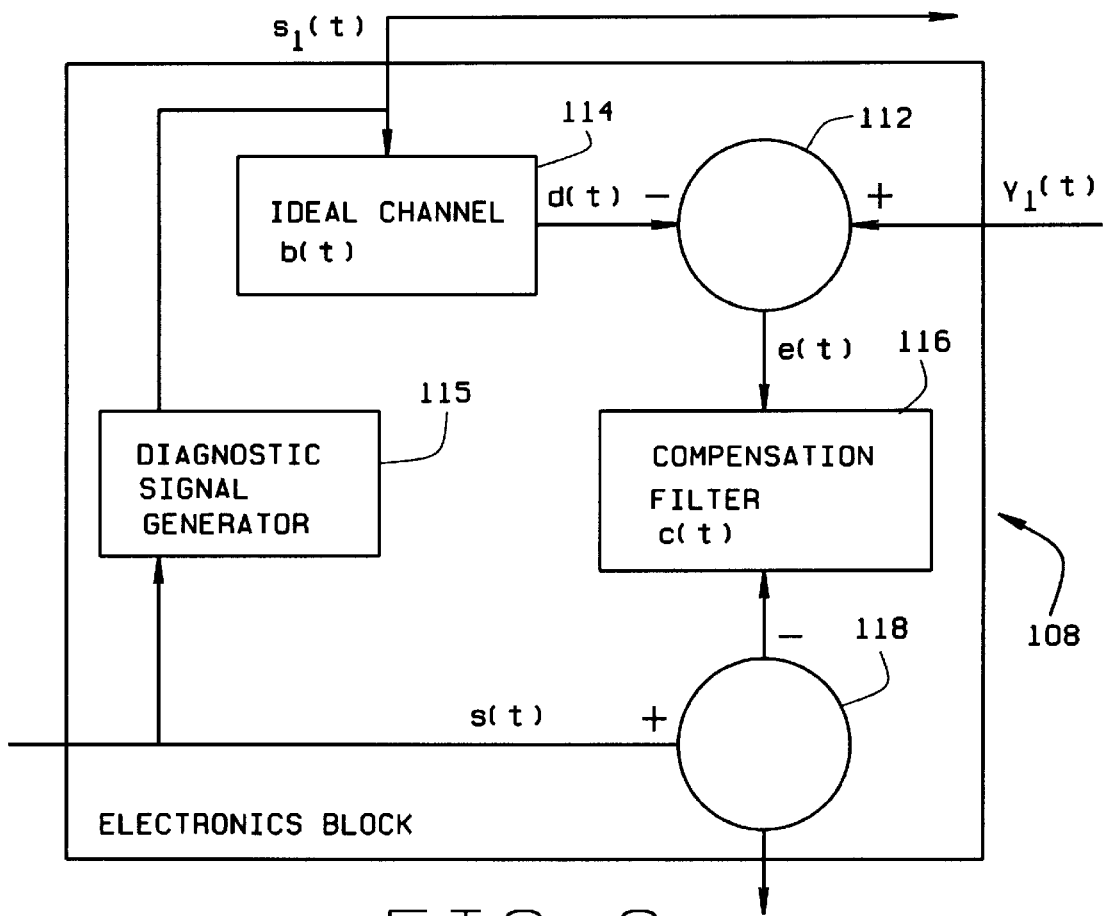
FIG. 8 is a block diagram of the electronics shown in FIG. 7.

Further explanation of this write-read-write embodiment of the present invention is found in FIGS. 7 and 8. As shown in FIG. 7, a first write head 102 writes the signal $s_1(t)$ on the medium 104. The recorded signal is then read by read head 106 which produces an output $y_1(t)$ to an electronics circuit 108, as explained in FIG. 8. The electronics 108 produces a compensated data signal which is then written by write head 110 back on the magnetic medium 104. The write head 110 thus writes a precompensated version of the data signal $s(t)$ which, after being read by another read head (not shown) produces an output of data signal $s(t)$ which has been compensated for additive repeatable magnetic noise.

As shown in FIG. 8, the electronics 108 includes an adder 112 which subtracts an output signal $d(t)$ from ideal channel 114 having a function $b(t)$ which processes the diagnostic signal $s_1(t)$ as equivalent to a write and read function. Diagnostic signal generator 115 processes the data signal $s(t)$ to produce the diagnostic signal $s_1(t)$. For example, $s_1(t)$ could be a DC saturation signal. The output of adder 112 produces an error signal $e(t)$ which is then compensated by compensation filter 116 through a signal transformation function $c(t)$. As explained above, the compensation filter function $c(t)$ is the inverse of the noise expected to be added by a write and read function. A second adder 118 subtracts the output of compensation filter 116 from the data signal $s(t)$ to produce a signal which corresponds to a precompensated data signal for writing onto the magnetic medium by write head 110. As noted above, the generalized model and algorithm for each of the functions included in FIGS. 7 and 8 may be readily determined by one or ordinary skill in the art from the equations given in Exhibit A.

In still another implementation of the noise compensation methodology of the present invention, a playback device may be manufactured and sold which is capable of producing a noise compensated signal from recordings on magnetic media which have not been noise compensated. In this embodiment of the present invention, the signal is first read, such as by recording transducer 32 in FIG. 3, the remanent noise is then determined such as by saturating the magnetic medium with a signal from transducer 34 and reading the remanent noise with transducer 36, and then the original signal would be compensated with said remanent noise prior to playback or other processing. Although not specifically shown, a fourth transducer may be provided to re-record either the original signal or the compensated signal back on the magnetic medium 38 for subsequent playback. With this device and method, conventional recordings on magnetic media may be compensated for remanent noise prior to playback. Also, perhaps while being played, magnetic media may be transformed from uncompensated to noise compensated recordings. Thus, with this implementation, a device may be made and sold for use with the vast inventory of pre-recorded magnetic media presently in the public's hands.

In still another implementation of the present invention, the unique remanent noise pattern may be used as a benchmark to locate a transducer at a particular position in a magnetic medium. For example, for editing purposes, and as previously explained above, the conventional recording transducers 32–36 as shown in FIG. 3 could be readily used to determine the remanent noise at a particular position on the magnetic medium 38. This could then be used to reposition the transducers 32–36 at the start or finish of an edit, or otherwise to precisely position a conventional recording transducer with respect to the magnetic medium. This application would provide significant advantages in dubbing, etc. which is commonly used for taking rough cuts of many kinds of programs and editing them for final production. For that matter, editing is used in a large number of applications too numerous to mention herein. In each of these applications, it is desired to accurately and reliably reposition a recording transducer to ensure the continuity of the signal and program through the discontinuity created by the editing process. As the inventors' methodology provides a convenient and simple way to most accurately determine the exact position on a magnetic medium, and to find that exact position, the present invention provides a unique and novel way to position a recording transducer for editing.

Figure 4:
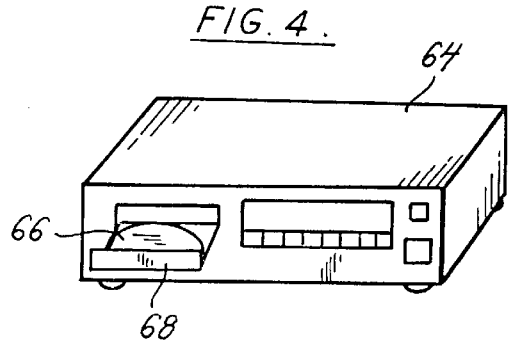
FIG. 4 is a perspective view of a magneto-optic disc player with a magneto-optic disc in its tray.

As shown in FIG. 4, a magneto-optic disc player 64 has a magneto-optic disc 66 in its tray 68 ready for play. As explained herein, a magneto-optic disc player 64 may play back remanent noise compensated magneto-optic discs 66. Furthermore, although not presently commercially available for home use, magneto-optic disc players 64 may soon be available which are capable of recording onto magneto-optic discs 66. In such event, all of the embodiments of the present invention may be implemented such that magneto-optic discs 66 may be noise compensated when played back, even though its original signal was not recorded in a noise compensated format, and CD player 64 used to re-record a noise compensated signal back onto magneto-optic disc 66.

Figure 5:
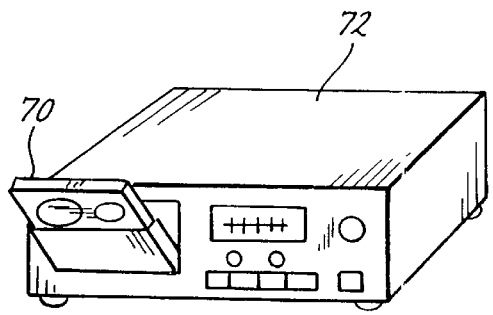
FIG. 5 is a cassette player depicting a cassette tape for play therein.

Similarly, a cassette player 72 as shown in FIG. 5 has a cassette 70 being inserted therein for play. This magnetic medium is also susceptible to implementation of the inventors' methodologies to enhance the record and/or playback of cassette 70 in remanent noise compensated format.

Figure 6:
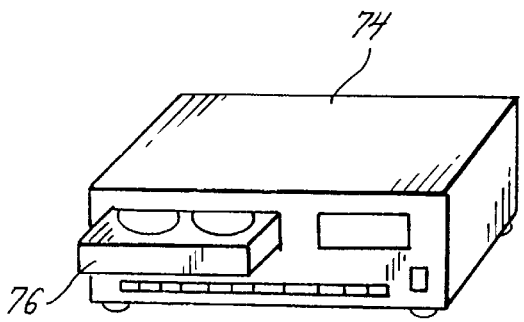
FIG. 6 is a perspective view of a VCR with a tape ready for insertion.

A last example of an implementation of the inventors' methodologies is shown in FIG. 6 and includes a VCR 74 with a video tape cassette 76 being inserted therein. As the video tape cassette 76 is a magnetic medium, it is also susceptible to the noise compensation methodologies disclosed and claimed herein.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A method for pre-compensating a signal for a remanent noise comprising the steps of:

recording a diagnostic signal on a portion of a magnetic medium, reading said portion of magnetic medium having the diagnostic signal recorded thereon, computing a compensation signal from the reading of said portion of magnetic medium, computing a source signal for recording using said compensation signal, and recording said source signal on said portion of magnetic medium.

2. The method of claim 1 wherein the step of computing the compensation signal includes the step of computing a repeatable noise component of said portion of magnetic medium.

3. The method of claim 2 wherein the step of computing a repeatable noise component includes the step of computing a repeatable noise component corresponding to a remanent noise of said portion of magnetic medium.

4. The method of claim 3 wherein said remanent noise is additive, and the step of computing the repeatable noise component corresponding to said remanent noise includes the step of subtracting a desired signal response for said diagnostic signal from the reading of said portion of magnetic medium.

5. The method of claim 1 wherein the step of recording the diagnostic signal includes the step of recording with a first write head, the step of reading said portion of magnetic medium includes the step of reading with a second read head, and the step of recording the source signal includes the step of writing with a third write head, all of said heads being substantially aligned to sequentially traverse the same portion of magnetic medium.

6. The method of claim 1 wherein the step of computing the source signal includes the step of subtracting the compensation signal from a signal desired to be recorded.

7. The method of claim 6 wherein the source signal desired to be recorded is used as the diagnostic signal.

8. The method of claim 6 wherein the diagnostic signal is a DC saturation signal.

9. The method of claim 1 further comprising the step of reading a prerecorded signal from the portion of the magnetic medium upon which the diagnostic signal is subsequently recorded, wherein the step of computing a source signal for recording includes computing said source signal using the reading of said prerecorded signal.

10. A method for pre-compensating a source signal desired to be recorded for a remanent noise comprising the steps of:

writing a diagnostic signal on a portion of magnetic medium with a first write head, reading said magnetic medium portion having the diagnostic signal written thereon with a second read head, electronically synthesizing a compensation signal by processing the reading of said magnetic medium portion and the diagnostic signal, electronically synthesizing a recordable signal by processing said compensation signal and said source signal, and recording said recordable signal with a third write head.

11. The method of claim 10 wherein all of said heads are substantially aligned with a direction of head travel so that said heads sequentially traverse the same portion of magnetic medium.

12. The method of claim 11 wherein the step of synthesizing a compensation signal includes the process of convolution.

13. The method of claim 12 wherein the step of synthesizing a recordable signal includes the step of subtracting said compensation signal.

14. The method of claim 13 wherein the step of subtracting includes the step of subtracting said compensation signal from the source signal.

15. The method of claim 10 wherein the source signal desired to be recorded is used as the diagnostic signal.

16. The method of claim 10 wherein the diagnostic signal is a DC saturation signal.

17. The method of claim 10 further comprising the step of reading the source signal from said magnetic medium portion with a fourth read head.

18. The method of claim 10 wherein the step of electronically synthesizing a compensation signal includes the step of determining a desired signal response for said diagnostic signal.

19. The method of claim 18 wherein the step of electronically synthesizing a compensation signal further includes the step of computing an error signal by subtracting the desired signal response for said diagnostic signal from the reading of said magnetic medium portion.

20. The method of claim 19 wherein the step of electronically synthesizing a compensation signal further includes the step of processing the error signal with a filter function representing an inverse of the noise expected to be added by subsequent recording and reading steps.

* * * * *